United States Patent
Meyer et al.

(10) Patent No.: US 11,208,920 B2
(45) Date of Patent: Dec. 28, 2021

(54) CONTROL OF POWER GENERATION SYSTEM WITH WATER LEVEL CALIBRATION FOR PRESSURE VESSEL

(71) Applicant: General Electric Company, Schenectady, NY (US)

(72) Inventors: John Lawrence Meyer, Gloversville, NY (US); Cody Joe Bushey, Charlton, NY (US)

(73) Assignee: General Electric Company, Schenectady, NY (US)

(*) Notice: Subject to any disclaimer, the term of this patent is extended or adjusted under 35 U.S.C. 154(b) by 102 days.

(21) Appl. No.: 16/433,119

(22) Filed: Jun. 6, 2019

(65) Prior Publication Data
US 2020/0386121 A1 Dec. 10, 2020

(51) Int. Cl.
*F01K 13/02* (2006.01)
*F01K 13/00* (2006.01)
(Continued)

(52) U.S. Cl.
CPC .............. *F01K 13/02* (2013.01); *F01D 17/02* (2013.01); *F01D 25/32* (2013.01); *F01K 13/003* (2013.01);
(Continued)

(58) Field of Classification Search
CPC ...... F01K 13/02; F01K 13/003; F01K 13/006; F01D 25/32; F01D 17/02; G05B 11/42;
(Continued)

(56) References Cited

U.S. PATENT DOCUMENTS

| 4,031,404 A | 6/1977 | Martz et al. |
| 4,069,675 A | 1/1978 | Adler et al. |

(Continued)

FOREIGN PATENT DOCUMENTS

| JP | 2006046874 A | 2/2006 |
| JP | 2007170814 A | 7/2007 |
| WO | 2010126433 A1 | 11/2010 |

OTHER PUBLICATIONS

U.S. Appl. No. 15/051,046, Office Action dated Mar. 13, 2018, 21 pages.

(Continued)

*Primary Examiner* — Rocio Del Mar Perez-Velez
*Assistant Examiner* — Christopher W Carter
(74) *Attorney, Agent, or Firm* — Hoffman Warnick LLC

(57) ABSTRACT

Embodiments of the present disclosure include a method for controlling a power generation system, the method including: calculating, during operation of the power generation system, a target water level within a pressure vessel of the power generation system, the pressure vessel receiving a feedwater input and generating a steam output; calculating a flow rate change of the steam output from the pressure vessel; calibrating the target water level within the pressure vessel based on the output from mass flux through the pressure vessel, the mass flux through the pressure vessel being derived from the at least the feedwater input and the steam output; and adjusting an operating parameter of the power generation system based on the calibrated target water level within the pressure vessel.

14 Claims, 5 Drawing Sheets

(51) Int. Cl.
  *F01D 17/02*   (2006.01)
  *F01D 25/32*   (2006.01)
  *F22D 5/34*    (2006.01)
  *G05B 11/42*   (2006.01)

(52) U.S. Cl.
  CPC .............. *F01K 13/006* (2013.01); *F22D 5/34* (2013.01); *G05B 11/42* (2013.01); *F05D 2210/12* (2013.01); *F05D 2220/31* (2013.01); *F05D 2260/60* (2013.01); *F05D 2260/81* (2013.01); *F05D 2270/20* (2013.01); *F05D 2270/3061* (2013.01); *F05D 2270/44* (2013.01)

(58) Field of Classification Search
  CPC .............. F22D 5/34; F05D 2270/3061; F05D 2210/12; F05D 2270/20; F05D 2260/60; F05D 2270/44; F05D 2220/31; F05D 2260/81
  USPC ........................................................ 700/288
  See application file for complete search history.

(56) References Cited

U.S. PATENT DOCUMENTS

| | | |
|---|---|---|
| 4,174,618 A | 11/1979 | Jenkins, Jr. et al. |
| 4,242,989 A | 1/1981 | Chamberlain |
| 4,353,204 A | 10/1982 | Arakawa |
| 4,437,313 A | 3/1984 | Taber et al. |
| 4,497,283 A | 2/1985 | LaSpisa et al. |
| 4,573,323 A | 3/1986 | Mock |
| 4,802,446 A | 2/1989 | Triggs |
| 5,148,775 A | 9/1992 | Peet |
| 5,419,285 A | 5/1995 | Gurevich et al. |
| 5,771,846 A | 6/1998 | Ruchti |
| 6,237,542 B1 | 5/2001 | Nakajo et al. |
| 6,412,285 B1 | 7/2002 | Ranasinghe et al. |
| 6,851,265 B2 | 2/2005 | Elwood et al. |
| 7,017,407 B1 | 3/2006 | Hatfield et al. |
| 7,385,300 B2 | 6/2008 | Huff et al. |
| 7,603,185 B2 | 10/2009 | Stewart et al. |
| 8,397,679 B2 | 3/2013 | Kozaki |
| 8,463,445 B2 | 6/2013 | Kumar et al. |
| 8,757,105 B2 | 6/2014 | Kumar et al. |
| 8,813,471 B2 | 8/2014 | Gulen et al. |
| 8,887,747 B2 | 11/2014 | Kumar et al. |
| 2005/0178759 A1 | 8/2005 | Arora et al. |
| 2009/0159018 A1 | 6/2009 | Mehendale et al. |
| 2010/0126433 A1 | 5/2010 | Kozaki |
| 2010/0139392 A1 | 6/2010 | Kumar et al. |
| 2011/0295432 A1 | 12/2011 | Kumar et al. |
| 2013/0319536 A1 | 12/2013 | Kumar et al. |
| 2014/0331683 A1 | 11/2014 | Mazzaro et al. |
| 2015/0090202 A1 | 4/2015 | Nenmeni et al. |
| 2015/0167961 A1 | 6/2015 | Tiwari et al. |
| 2017/0074505 A1* | 3/2017 | Yano ...................... F22D 11/06 |
| 2017/0241298 A1* | 8/2017 | Petzen, III ................ F02C 6/18 |
| 2017/0344032 A1* | 11/2017 | Unnikrishnan ........ G06N 7/005 |

OTHER PUBLICATIONS

U.S. Appl. No. 15/051,046, Final Office Action dated Sep. 10, 2018, 16 pages.

U.S. Appl. No. 15/051,046, Notice of Allowance dated Jan. 31, 2019, 6 pages.

* cited by examiner

CONTROL OF POWER GENERATION SYSTEM WITH WATER LEVEL CALIBRATION FOR PRESSURE VESSEL

BACKGROUND

The disclosure relates generally to power generation systems, and more particularly, to a method for actively calibrating and controlling the water level in a pressure vessel to account for sudden fluctuations in the water level, e.g., during transient operation. Various embodiments of the disclosure may be particularly suited for operating a heat recovery steam generator (HRSG) of a power generation system.

Power generation systems typically include a variety of different turbomachines and/or systems that are used to generate a power output. Two conventional power systems used to generate power include gas turbine systems and combined cycle power plants, which typically include a gas turbine system(s). Conventional combined cycle power plants employ one or multiple gas turbine system(s) operatively coupled to one or multiple steam turbine system(s). The gas turbine system includes a compressor coupled to a gas turbine. The gas turbine is usually coupled to and drives an external component, such as a generator, for producing a load or power output. The steam turbine system includes a high pressure (HP) turbine portion operatively coupled to an intermediate pressure (IP) turbine portion that, in turn, is coupled to a low pressure (LP) turbine. Similar to the gas turbine of the gas turbine system, the HP, IP and LP turbines are employed to drive an external component (e.g., generator). In a typical combined cycle power plant, exhaust gas from the gas turbine is passed to a heat recovery steam generator (HRSG), which may be used to reheat and provide steam to the various turbines of the steam turbine system for enhanced efficiency of the system and/or power plant. Downstream of the HRSG the exhaust gas is released to the atmosphere through a stack.

Various power generation system configurations may feature components to generate steam for power generation. In various embodiments, the steam generation may be driven at least in part by heat exchange with various fluids such as exhaust gas from the gas turbine. To provide this function, the pressure vessel may encounter two-phase fluid flow of liquid feedwater and steam, where the steam is output to a turbine component of the HRSG. In this case, the two-phase fluid flow may be difficult to model and control when various operational circumstances (e.g., transient operation of the power generation system) cause different effects to the water and steam flows of a single pressure vessel.

SUMMARY

A first aspect of the disclosure provides a method for controlling a power generation system, the method including: calculating, during operation of the power generation system, a target water level within a pressure vessel of the power generation system, wherein the pressure vessel receives a feedwater input to generate a steam output; calculating a flow rate change of the steam output of the pressure vessel; calibrating the target water level within the pressure vessel based on the flow rate change of the steam output from the pressure vessel and a mass flux through the pressure vessel, wherein the mass flux through the pressure vessel is derived from at least the feedwater input and the steam output; and adjusting an operating parameter of the power generation system based on the calibrated target water level within the pressure vessel.

A second aspect of the disclosure provides a system for controlling a power generation system, the system including: a system controller in communication with at least one sensor within the power generation system, the system controller being operable to: calculate, during operation of the power generation system, a target water level within the pressure vessel of the power generation system, wherein the pressure vessel receives a feedwater input to generate a steam output, calculate a flow rate change of the steam output from the pressure vessel, and calibrate the target water level within the pressure vessel based on the flow rate change of the steam output from the pressure vessel and a mass flux through the pressure vessel, wherein the mass flux through the pressure vessel is derived from at least the feedwater input and the steam output; and a flow valve operably coupled to the system controller and a component of the power generation system, the flow valve being operable to adjust an operating parameter of the power generation system based on the calibrated target water level within the pressure vessel.

A third aspect of the invention provides a program product stored on a computer readable storage medium for controlling a power generation system, the computer readable storage medium including program code for causing a computer system to perform actions including: calculating, during operation of the power generation system, a target water level within a pressure vessel of the power generation system, wherein the pressure vessel receives a feedwater input to generate a steam output; calculating a flow rate change of the steam output from the pressure vessel; calibrating the target water level within the pressure vessel based on the flow rate change of the steam output from the pressure vessel and a mass flux through the pressure vessel, wherein the mass flux through the pressure vessel is derived from at least the feedwater input and the steam output; and adjusting an operating parameter of the power generation system based on the calibrated target water level within the pressure vessel.

BRIEF DESCRIPTION OF THE DRAWINGS

These and other features of the disclosed system will be more readily understood from the following detailed description of the various aspects of the system taken in conjunction with the accompanying drawings that depict various embodiments, in which.

It is noted that the drawings are not necessarily to scale. The drawings are intended to depict only typical aspects of the disclosure, and therefore should not be considered as limiting its scope. In the drawings, like numbering represents like elements between the drawings.

DETAILED DESCRIPTION

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be used and that changes may be made without departing from the scope of the present teachings. The following description is, therefore, merely illustrative.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the engine, and "aft" referring to the rearward or turbine end of the engine. It is often required to describe parts that are at differing radial positions with regard to a center axis. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the turbine.

As indicated above, the disclosure relates generally to the control of a power generation system, and more particularly, to controlling the power generation system by continuously calibrating a target water level of a pressure vessel within the power generation system.

These and other embodiments are discussed below with reference to FIGS. 1-5. However, those skilled in the art will readily appreciate that the detailed description given herein with respect to these Figures is for explanatory purposes only and should not be construed as limiting.

Figure 1:
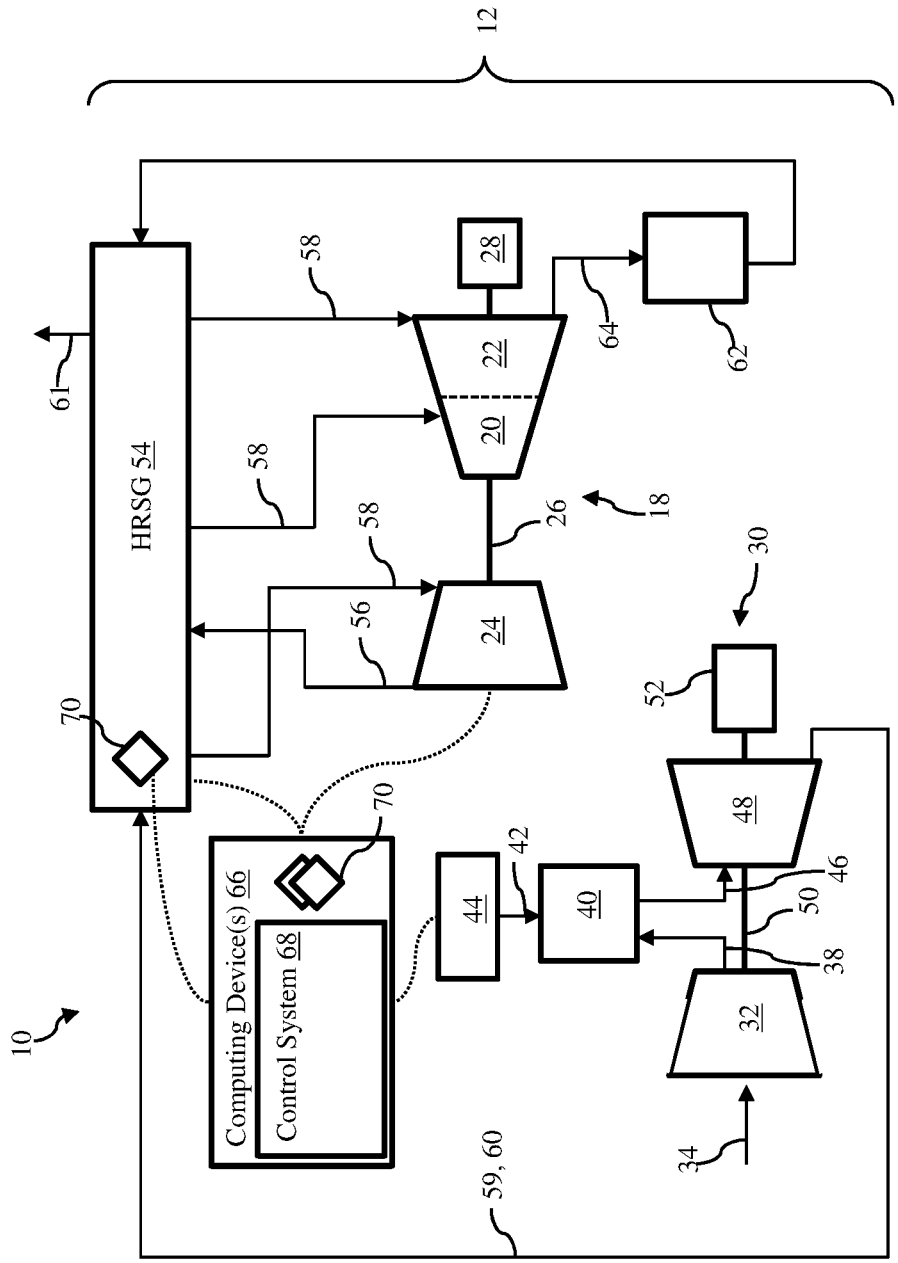
FIG. 1 shows a schematic depiction of a combined cycle power plant system including a gas turbine system, a steam turbine system, a heat recovery steam generator, and a control system, according to embodiments of the disclosure.

FIG. 1 shows a schematic depiction of a system 10 according to various embodiments of the disclosure. As shown, system 10 can include a combined cycle power generation system 12 (hereafter, "power generation system 12") including a steam turbine (ST) system 18, which in the depiction shown, can include a high pressure (HP) portion 20, an intermediate pressure (IP) portion 22 and a low pressure (LP) portion 24, as is known in the art. HP portion 20, IP portion 22 and LP portion 24 of ST system 18 may all be coupled and/or positioned on and/or may be configured to rotate a shaft 26 to produce mechanical work and/or to drive an additional component of ST system 18. As shown in FIG. 1, shaft 26 of ST system 18 may be coupled to and/or may drive an external component, and more specifically, a generator 28 configured to generate power and/or produce a load.

Power generation system 12 can further include a gas turbine (GT) system 30. GT system 30 may include a compressor 32. Compressor 32 compresses an incoming flow of fluid 34 (e.g., air) as it flows through compressor 32. Compressor 32 may include a plurality of stages of stator vanes (not shown) and rotating blades (not shown) positioned within compressor 32. The stator vanes and rotating blades positioned within compressor 32 may be configured to aid in moving and/or passing fluid 34 through compressor 32. Compressor 32 delivers a flow of compressed fluid 38 (e.g., compressed air) to a combustor 40. Combustor 40 mixes the flow of compressed fluid 38 with a pressurized flow of fuel 42 provided by a fuel supply 44 and ignites the mixture to create a flow of combustion gas 46. The flow of combustion gas 46 is in turn delivered to a turbine component 48, which typically includes a plurality of stages of stator vanes (not shown) and turbine blades (not shown), similar to compressor 32. The flow of combustion gas 46 drives turbine component 48 to produce mechanical work. The mechanical work produced in turbine component 48 drives compressor 32 via a shaft 50, and may be used to drive a generator 52 (e.g., external component) configured to generate power and/or produce a load.

Although power generation system 12 is shown in FIG. 1 to include a dual-shaft configuration where two separate generators 28, 52 are utilized, it is understood that in other non-limiting examples, ST system 18 and GT system 30 may share a single shaft and in turn, may share a single generator. Additionally, although power generation system 12 is shown to only include a single ST system 18 and single GT system 30, it is understood that power generation system 12 may include a plurality of ST systems 18 and/or GT system(s) 30 that may be configured to generate an operational load and/or power output.

Power generation system 12 can further include a heat recovery steam generator (HRSG) 54 fluidly connected with ST system 18 (e.g., with HP portion 20, IP portion 22 and/or LP portion 24) and GT system 30. As shown in the non-limiting example of FIG. 1, HRSG 54 may be fluidly connected and/or coupled with ST system 18 via exhaust conduit(s) 56 to receive exhaust fluid (e.g., steam) from ST system 18, and may be coupled via supply conduits 58 to provide steam to the portions of ST system 18 via supply conduits 58. Additionally in the non-limiting example of FIG. 1, HRSG 54 may be fluidly connected and/or coupled with GT system 30 via an exhaust channel 59 coupled to and/or in fluid communication with turbine component 48. Exhaust channel 59 may provide exhaust fluid 60 (e.g., gas) from GT system 30 to HRSG 54 to be utilized in generating and/or heating steam for ST system 18. A stack 61 of HRSG 54 may exhaust or release (excess or used) gas (e.g., exhaust fluid 60) and/or fluid from HRSG 54 into the atmosphere and/or out of power generation system 12.

Power generation system 12 can further include a condenser 62. Condenser 62 may be in fluid communication and/or may be fluidly coupled with various components of power generation system 12. In a non-limiting example, condenser 62 may be fluidly connected and/or coupled to LP portion 24 of ST system 18 via steam exhaust duct 64. Condenser 62 may be configured to condense exhaust flow and/or bypass flow (not shown) from ST system 18 and/or HRSG 54, and providing a condensed fluid (e.g., condensate water) to HRSG 54, as is known in the art.

As shown in FIG. 1, system 10 can include at least one computing device 66 configured to control power generation system 12. Computing device(s) 66 can be hard-wired and/or wirelessly connected to and/or in communication with power generation system 12, and its various components (e.g., ST system 18, GT system 30, HRSG 54 and so on) via any suitable electronic and/or mechanical communication component or technique. Computing device(s) 66, and its various components discussed herein, may be a single stand-alone system that functions separate from another power plant control system (e.g., computing device) (not shown) that may control and/or adjust operations and/or functions of power generation system 12, and its various components (e.g., ST system 18, GT system 30 and so on). Alternatively, computing device(s) 66 and its components may be integrally formed within, in communication with and/or formed as a part of a larger power plant control system (e.g., computing device) (not shown) that may control and/or adjust operations and/or functions of power generation system 12, and its various components (e.g., ST system 18, GT system 30 and so on).

In various embodiments, computing device(s) 66 can include a controller 68 and one or more sensors 70, as described herein, for controlling operations of power generation system 12. As discussed herein controller 68 can control power generation system 12, and its various components, to affect the operation of power generation system 12. For example, and as discussed herein, controller 68 may use various types of data and/or operational characteristics of HRSG 54, and the components included therein, determined by sensor(s) 70 to control the operation of system 10 and/or affect various attributes thereof. In some cases, controller 68 may take the form of a proportional-integral-derivative (PID) controller for managing transient operation of power generation system 12, or may include a PID sub-system configured to operate selectively during transient operation. A PID controller or sub-system, refers to a system configured to calculate an error value on a continuous basis as the difference between a desired target value, or "setpoint," and one or more predetermined variables. The PID controller, upon detecting variance between the variable(s) and a corresponding setpoint, will apply a corrective adjustment, i.e., instructions to vary one or more properties of power generation system 12 such as a valve position. According to an example, the corrective adjustment of a PID controller may modify an instruction, e.g., to adjust a valve controlling a particular fluid to a 90% flow rate position, into a corrected instruction to adjust the valve to a 70% flow rate position. PID controllers thus may amplify or mitigate corrective actions output from other algorithms and/or controllers of power generation system 12. The corrective adjustment may be calculated from the variable(s) and setpoint(s) based on proportional, integral, and derivative terms to accommodate past, current, and projected rates of change. In embodiments of the disclosure which include a PID controller or PID sub-system of controller 68, adjusting an operating parameter of power generation system 12 may include modifying the corrective adjustment of the PID controller or PID sub-system.

As shown in FIG. 1, computing device(s) 66 may include and/or may be in electrical and/or mechanical communication with sensor(s) 70, as well as many other additional and/or intermediate components such as valves, solenoids, actuators, converters, etc. (not shown) positioned throughout system 10. As shown in the non-limiting example of FIG. 1, and discussed herein, at least one sensor 70 of and/or connected to computing device(s) 66 may be positioned within HRSG 54 or one or more of its various subcomponents as discussed elsewhere herein. Sensor(s) 70 in communication with computing device(s) 66 of system 10 may be any suitable sensor or device configured to detect and/or determine data, information, and/or operational characteristics relating to power generation system 12 during operation. For example, and as discussed herein, sensor(s) 70 positioned within HRSG 54 of power generation system 12 may be any suitable sensor configured to detect and/or determine the properties of a working fluid (e.g., steam, exhaust fluid 60). Such properties may include the working fluid temperature within portions and/or components of HRSG 54, temperatures of component(s) of HRSG 54 of power generation system 12, and/or steam flow measurements of steam flowing through HRSG 54. In non-limiting examples, sensor(s) 70 may be configured as, but not limited to, thermometers, thermistor, thermocouples, and/or any other mechanical/electrical temperature sensors.

Figure 2:
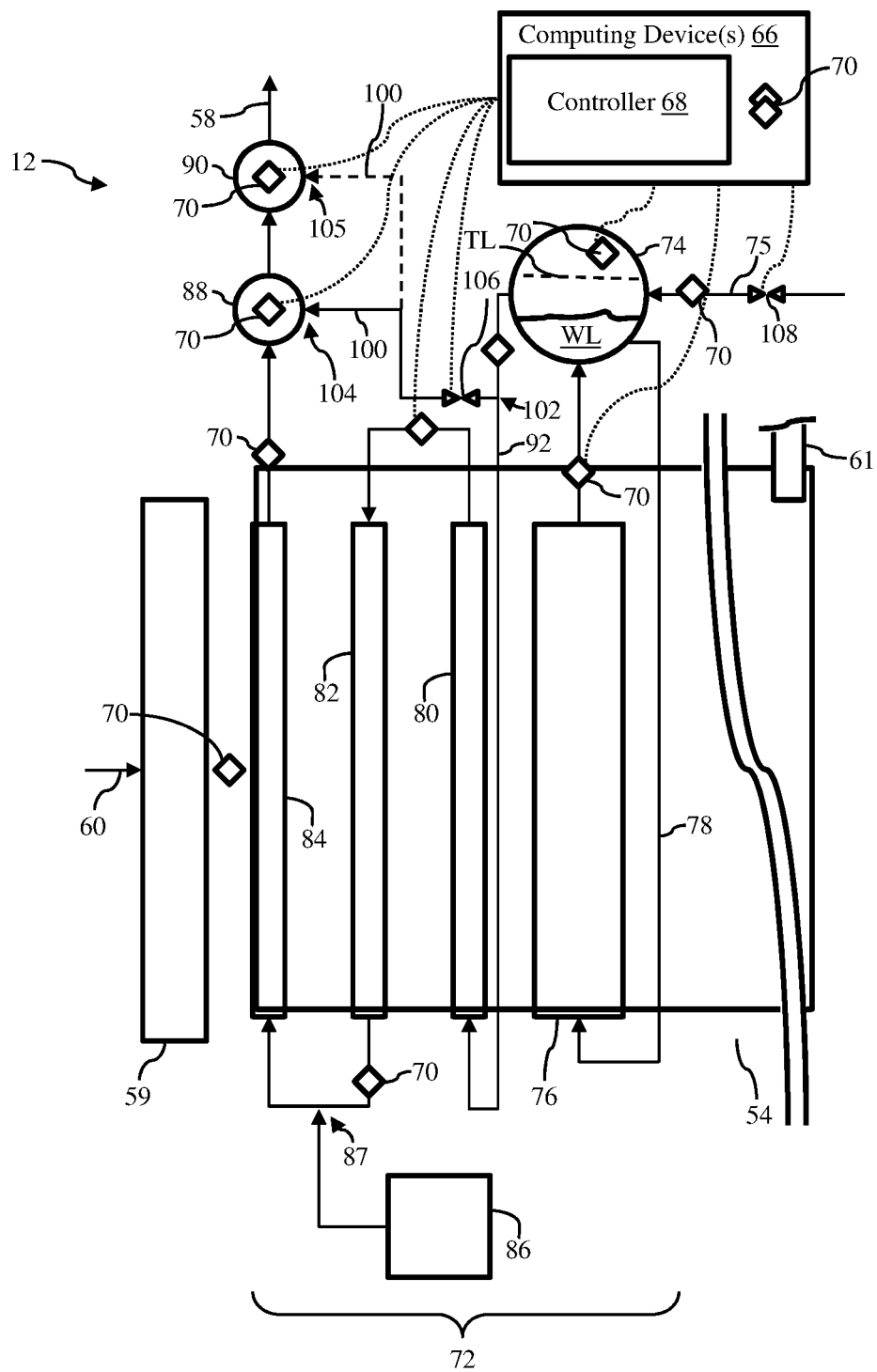
FIG. 2 shows a schematic depiction of a portion of a heat recovery steam generator (HRSG) of the combined cycle power plant system of FIG. 1 according to embodiments of the disclosure.

Although two sensors 70 are shown, it is understood that system 10 may include more sensors 70 (e.g., as shown in FIG. 2) that may be configured to provide computing device(s) 66, and specifically controller 68, with information or data relating to the temperature of the fluids and components included within HRSG 54, and/or fluid flow measurements. The number of sensors 70 shown in FIG. 1 is merely illustrative and non-limiting. As such, system 10 may include more or fewer sensors 70 than depicted in FIG. 1 or other figures.

FIG. 2 shows a schematic view of a portion of HRSG 54 of power generation system 12 shown in FIG. 1. Specifically, FIG. 2 shows a schematic view of a portion of HRSG 54 and a portion of the components and/or systems (e.g., boiler modules) included therein for generating and/or providing steam to the portions of ST system 18 (see, FIG. 1) via supply conduits 58, as discussed herein. It is understood that similarly numbered and/or named components may function in a substantially similar fashion. Redundant explanation of these components has been omitted for clarity.

As shown in FIG. 2, and as discussed herein with respect to FIG. 1, exhaust channel 59 may provide exhaust fluid 60 (e.g., gas) from GT system 30 (FIG. 1) to HRSG 54. Exhaust fluid 60 may flow through HRSG 54, and/or over a plurality of components (e.g., boiler modules) of HRSG 54, discussed herein, to generate and/or heat steam that may be provided to ST system 18 via supply conduits 58. After exhaust fluid 60 passes through HRSG 54, exhaust fluid 60 may exhaust or release from HRSG 54 into the atmosphere and/or out of power generation system 12 via stack 61 of HRSG 54.

HRSG 54 may include a plurality of components, systems and/or boiler modules that may exchange heat with exhaust fluid 60 to generate and/or heat steam for ST system 18. For example, HRSG 54 may include a plurality of boiler modules 72 extending through and/or positioned within each HRSG 54. Each of the plurality of boiler modules 72 (one shown) of HRSG 54 may generate steam for and/or correspond to each of the plurality of portions of ST system 18 (e.g., HP portion 20, IP portion 22, etc.). In the non-limiting example shown in FIG. 2, boiler module 72 shown may correspond to and/or generate steam for HP portion 20 of ST system 18. Although only a single boiler module 72 is shown, it is understood that HRSG 54 may also include a plurality of boiler modules generating, receiving, and/or supplying steam for ST system 18.

Boiler module 72 of HRSG 54, and various components, may be in fluid communication with at least one pressure vessel 74 of HRSG 54 for receiving, generating and/or providing steam. Pressure vessel 74 may be in fluid communication with a feedwater conduit 75 for providing a feedwater input (i.e., a flow of feedwater) to the interior of pressure vessel 74. Pressure vessel 74 may also be fluidly connected to one or more portions of boiler module 72. During operation, feedwater within pressure vessel 74 may flow through boiler module 72, where it may be heated (e.g., by heat exchange with exhaust fluid 60). The steam exiting boiler module 72 may return to pressure vessel 74, e.g., in the form of heated water supplied to pressure vessel 74. As shown in the non-limiting example of FIG. 2, boiler module 72 may include a steam generator module 76 in fluid communication with pressure vessel 74, and vice versa. A feedwater conduit 78 may be in fluid communication with pressure vessel 74 and steam generator module 76 of boiler module 72, and may provide feedwater to steam generator module 76. Steam generator module 76 may in turn move the feedwater through HRSG 54 to allow exhaust fluid 60 flowing through HRSG 54 to convert the feedwater to steam within steam generator module 76. Steam generator module 76 may then provide a mixture of water and saturated steam to pressure vessel 74 as noted herein.

In the example arrangement shown, pressure vessel 74 may receive a two-phase fluid input in the form of feedwater from feedwater conduit 75, and a mix of steam and water supplied to pressure vessel 74 via steam generator module 76. The amount of liquid water within pressure vessel 74 at any point in time may be denoted as a water level WL of pressure vessel 74. Water level WL may be quantified by any suitable metric, e.g., a total water volume, a water height within pressure vessel 74, a percentage of pressure vessel 74 volume occupied by water, etc. Water level WL may be measured directly or indirectly via sensor(S) 70 in communication with computing device(s) 66. A target water level TL may represent the desired amount of water within pressure vessel 74 at a given time. Though target water level TL is shown to be higher than water level WL in the example of FIG. 2, TL may alternatively be less than WL or at approximately the same position as WL at various times during operation.

The steam generated by steam generator module 76 may be provided to one or more superheater modules of boiler module 72 of HRSG 54. In the non-limiting example shown in FIG. 2, boiler module 72 may include a first superheater module 80, a second superheater module 82, and a third superheater module 84. Each of the plurality of superheater modules 80, 82, 84 of boiler module 72 of HRSG 54 may heat the steam generated and/or provided by steam generator module 76 to a desired temperature before subsequently being provided to HP portion 20 of ST system 18, as discussed herein. As similarly discussed herein with respect to steam generator module 76, each of the plurality of superheater modules 80, 82, 84 may move steam through HRSG 54 and may utilize exhaust fluid 60 flowing through HRSG 54 to heat the flows of steam therein. Additionally, although three superheater modules 80, 82, 84 are shown, it is understood that boiler module 72 and/or HRSG 54 may also include more or fewer superheater modules, and the number shown is understood as merely illustrative.

First superheater module 80 may be positioned downstream of pressure vessel 74 and steam generator module 76. Specifically, first superheater module 80 may be positioned downstream of and may be in fluid communication with pressure vessel 74. As such, pressure vessel 74 may provide, and/or first superheater module 80 may receive the steam generated by steam generator module 76 from pressure vessel 74. Second superheater module 82 and third superheater module 84 may be positioned downstream of first superheater module 80. More specifically, second superheater module 82 may be positioned downstream of first superheater module 80, and third superheater module 84 may be positioned downstream of first superheater module 80 and second superheater module 82, respectively. Additionally, second superheater module 82 may be positioned upstream of third superheater module 84. Additionally, and as shown in the non-limiting example of FIG. 2, the plurality of superheater modules 80, 82, 84 may be in fluid communication with one another and may move the steam through each of the plurality of superheater modules 80, 82, 84, as discussed herein. That is, second superheater module 82 may be in fluid communication with first superheater module 80, and may receive steam from first superheater module 80. Furthermore, third superheater module 84 may be in fluid communication with second superheater module 82, and may receive steam from second superheater module 82. Each of the plurality of superheater modules 80, 82, 84 may be in fluid communication with one another, and other components of HRSG 54, via fluid conduits depicted herein as arrows. The direction of the arrows may also identify the flow direction of the steam through boiler module 72 and/or HRSG 54, as discussed herein.

HRSG 54 of power generation system 12 in some cases may include a desuperheater module 86. As shown in the non-limiting example of FIG. 2, desuperheater module 86 may be positioned, e.g., between second superheater module 82 and third superheater module 84. Desuperheater module 86 may include an inlet 87 positioned between and/or directly on the conduit fluidly coupling second superheater module 82 and third superheater module 84. Desuperheater module 86 may be included within boiler module 72 to control and/or alter the temperature of the steam flowing through the plurality of superheater modules 80, 82, 84 of HRSG 54. For example, desuperheater module 86 may provide cooling fluid (e.g., cold air, water spray, and so on) to the steam flowing from second superheater module 82, and prior to the steam entering third superheater 84. As such, desuperheater module 86 may provide cool air, and/or cool water spray within boiler module 72 of HRSG 54 to ensure that the steam moving through the plurality of superheater modules 80, 82, 84 does not exceed a desired temperature within HRSG 54.

Additionally, HRSG 54 may also include a steam header 88 (hereafter, "header 88") and a steam outlet manifold 90 (hereafter, "outlet manifold 90"), respectively. As shown in FIG. 2, header 88 may be positioned downstream of and may be in fluid communication with third superheater module 84 of boiler module 72. Additionally, outlet manifold 90 may be positioned downstream of and may be in fluid communication with header 88. Outlet manifold 90 may also be in fluid communication with supply conduit 58 for HP portion 20 of ST system 18 (see, FIG. 1), as discussed herein. During operation of HRSG 54, third superheater module 84 in fluid communication with header 88 may provide heated steam to header 88. The heated steam provided to header 88 may have previously passed through one or more superheater modules 80, 82, 84, and may be heated to a high-temperature equal to the operational parameters and/or temperature requirements of HP portion 20 of ST system 18. This heated, high-temperature steam may then provide the heated steam to outlet manifold 90, which may subsequently move the heated, high-temperature steam to HP portion 20 of ST system 18 via supply conduit 58 (see, FIG. 1).

Although depicted or represented as a block herein, it is understood that steam generator module 76 and/or each of the plurality superheater modules 80, 82, 84 may include a plurality of components. For example, steam generator module 76 and/or each superheater module 80, 82, 84 may include a plurality of tubes, conduits, and/or other fluid pathways positioned between and/or in fluid communication with two distinct manifolds formed on each end of the plurality of tubes. Modules 76, 80, 82, 84 may carry the working fluid (e.g., feedwater, steam) and may be exposed to the exhaust fluid 60 to generate and/or heat the steam flowing therein. Additionally, the manifolds coupled to the plurality of tubes may be in fluid communication with the conduits that fluidly couple steam generator module 76 and/or superheater modules 80, 82, 84. Additionally, although shown as single components, it is understood that header 88 and/or outlet manifold 90 may alternatively include a plurality of distinct, interconnected components (e.g., conduits).

Additionally as shown in FIG. 2, HRSG 54 may also include a bypass conduit 100. Bypass conduit 100 may receive a portion of the steam generated by steam generator module 76 for transport to another component (e.g., header 88, outlet manifold 90) of boiler module 72 and/or HRSG 54 downstream of steam generator module 76 to aid in reducing the thermal fatigue and/or stress experienced by the component, as discussed herein. Bypass conduit 100 may include an inlet 102, and an outlet 104 positioned opposite the inlet 102 on bypass conduit 100. Inlet 102 of bypass conduit 100 may be positioned downstream of steam generator module 76. In the non-limiting example shown in FIG. 2, inlet 102 of bypass conduit 100 may be positioned between pressure vessel 74 and/or steam generator module 76, and first superheater module 80. Specifically in the non-limiting example, inlet 102 may be formed on, positioned within, and/or may be in fluid communication with the conduit 92 disposed between and fluidly coupling pressure vessel 74 to first superheater module 80. As such, bypass conduit 100 may be provided with the steam generated by steam generator module 76, provided to pressure vessel 74, and subsequently provided to first superheater module 80, via conduit 92.

Additionally, outlet 104 of bypass conduit 100 may be positioned downstream of first super heater module 80. As shown in the non-limiting example of FIG. 2, outlet 104 of bypass conduit 100 may be formed in, positioned on, and/or in direct fluid communication with header 88 of HRSG 54. As such, bypass conduit 100 may be in fluid communication with conduit 92 and header 88, respectively, and may provide a portion of steam flowing through conduit 92 to header 88 of HRSG 54 via outlet 104. In another non-limiting example shown in FIG. 2, outlet 105 of bypass conduit 100 may be formed in, positioned on, and/or in direct fluid communication with outlet manifold 90 of HRSG 54 (see, bypass conduit 100, phantom section). In one example, bypass conduit 100 may be in fluid communication with conduit 92 and outlet manifold 90, respectively, and may provide a portion of steam flowing through conduit 92 to outlet manifold 90 of HRSG 54 via outlet 105. In an additional non-limiting example shown in FIG. 2, bypass conduit 100 may include two distinct outlets 104, 105. A first outlet 104 may be formed in, positioned on, and/or in direct fluid communication with header 88 of HRSG 54. A second outlet 105 may be formed in, positioned on, and/or in direct fluid communication with outlet manifold 90 of HRSG 54. In this non-limiting example, bypass conduit 100 may provide a portion of steam flowing through conduit 92 to both header 88 and outlet manifold 90 of HRSG 54 via the distinct outlets 104, 105.

Additionally, as shown in FIG. 2, HRSG 54 may include a bypass valve 106 in fluid communication with bypass conduit 100, and a flow valve 108 in fluid communication with feedwater conduit 75 to pressure vessel 74. According to one example, bypass valve 106 may be positioned on and/or formed directly on bypass conduit 100, between inlet 102 and outlet 104, respectively. Flow valve 108 may be positioned on and/or formed directly on feedwater conduit 75 externally to pressure vessel 74. In other non-limiting examples a valve may be positioned at and/or in direct fluid communication with outlet 104 of bypass conduit 100 or feedwater conduit 75 to pressure vessel 74, respectively. Bypass valve 106 may be in fluid communication with bypass conduit 100 to provide steam to and/or allow steam to flow through bypass conduit 100. That is, bypass valve 106 is in fluid communication with bypass conduit 100 to provide steam to outlet 104 of bypass conduit 100, and the respective portion or HRSG 54 in fluid communication with outlet 104 of bypass conduit 100. Flow valve 108 may control a flow rate of feedwater entering pressure vessel 74. Valves 106, 108 may be adjusted between an open position, a closed position, and any conceivable number of intermediate positions to control the flow of steam and/or feedwater therein. Valves 106, 108 may be any suitable flow valve, mechanism, device, and/or component capable of regulating and/or controlling the flow of steam through bypass conduit 100. For example, valves 106, 108 may be configured as any suitable hydraulic valve, pneumatic valve, manual valve, solenoid valve, or motorized valve, etc.

As shown in FIG. 2, and similarly discussed herein with respect to FIG. 1, computing device(s) 66, and more specifically, controller 68 of computing device(s) 66, may be operably coupled to and/or in electronic communication with various components of HRSG 54. For example, computing device(s) 66, and more specifically, controller 68 of computing device(s) 66, may be operably coupled to and/or in electronic communication with valve(s) 106, 108 of HRSG 54. Controller 68 of computing device(s) 66 may be configured to activate and/or control the operation of valve(s) 106, 108. Controller 68 may activate and/or control operation (e.g., open position, closed position, partially-open position) of valve(s) 106, 108 for active control of water level WL within pressure vessel 74 during operation of power generation system 12, as discussed herein. Such control of valve(s) 106, 108 with computing device(s) 66 and/or controller(s) 68, and/or similar features, may be characterized as adjusting an operational parameter of power generation system 12.

To help in the activation and/or control of valve(s) 106, 108, controller 68 may also use information obtained by sensor(s) 70 positioned with HRSG 54. As discussed herein with respect to FIG. 1, HRSG 54 may include sensor(s) 70 of computing device(s) 66 positioned therein. In the non-limiting example shown in FIG. 2, sensor(s) 70 may be positioned within various portions of HRSG 54 for obtaining a variety of information and/or operational characteristics for components of HRSG 54. For example, sensors 70 may be positioned within exhaust channel 59 to monitor exhaust fluid 60, on a conduit between steam generator module 76 and pressure vessel 74, on conduit 92 between pressure vessel 74 and first superheater module 80, on a conduit between first superheater module 80 and second superheater module 82, a conduit between second superheater module 82 and third superheater module 84, on feedwater conduit 75 to measure the flow rate of feedwater to pressure vessel 74, and a conduit between third superheater module 84 and header 88. Additionally, and as shown in the non-limiting example of FIG. 2, sensors 70 may be positioned within header 88 and outlet manifold 90, respectively. Furthermore, sensors 70 may be positioned within the housing of HRSG 54 adjacent to superheater modules 80, 82, 84. Specifically, and as shown in the non-limiting example of FIG. 2, sensor 70 may be positioned within HRSG 54, adjacent third superheater module 84, and adjacent to and/or downstream of exhaust channel 59.

As discussed herein, sensors 70 positioned within HRSG 54 may be configured to detect and/or determine a fluid temperature, fluid pressure, mass flow, component temperature, component pressure, and/or other properties of components and/or fluid flow. In the non-limiting examples shown in FIG. 2, the various sensors 70 positioned within and/or on conduits of boiler module 72 may determine the properties of the steam or other fluids (e.g., exhaust fluid 60 where applicable) flowing through HRSG 54. That is, sensors 70 may determine and/or detect the temperature, pressure, mass flow, etc., of fluids such as temperature of the steam flowing from pressure vessel 74 to first superheater module 80, the temperature of the steam flowing from first superheater module 80 to second superheater module 82, the temperature of the steam flowing from second superheater module 82 to third superheater module 84, and the temperature of the steam flowing from third superheater module 84 to header 88, the temperature of exhaust fluid(s) 60 in thermal communication with modules 76, 80, 82, 84, etc.

Additionally in the non-limiting example, sensors 70 may directly or indirectly measure a mass flow rate (e.g., volumetric flow in cubic meters per second) at the position where each sensor 70 is located. Additional sensors 70 in communication with computing device(s) 66 may be configured to detect or determine a duration of operation of the steam generator module 76 based on, for example, steam generation within HRSG 54, the temperature of exhaust fluid 60 (e.g., gas) flowing over superheater modules 80, 82, 84 and/or a steam flow measurement of the steam flowing through HRSG 54. The temperatures (e.g., steam, component), fluid flow measurement, and/or duration of operation detected by the various sensors 70 positioned within HRSG 54 may be provided to computing device(s) 66, and specifically controller 68. Using detected and/or measured temperatures, fluid flow measurement(s), duration of operation, etc., controller 68 may activate and/or adjust the operation or position of valve(s) 106, 108 to control water level WL within pressure vessel 74, e.g., to account for additional variables relevant to transient operation and/or other conditions of HRSG 54 during operation of power generation system 12, as discussed herein.

It is understood that the number of sensors 70 shown in FIG. 2 as being positioned within HRSG 54 is merely illustrative. As such, computing device(s) 66 may include more or fewer sensors 70 positioned within HRSG 54 to aid in the control of water level WL within pressure vessel 74 during operation of power generation system 12, as discussed herein. Additionally, although a portion of the plurality of sensors 70 are not depicted to be in communication with computing device(s) 66, it is understood that all sensors 70 shown in FIG. 2 are in communication with and/or are capable of providing detected-data relating to operational characteristics of components of HRSG 54 to computing device(s) 66, as discussed herein. Furthermore, although computing device(s) 66, controller 68, and sensors 70 are only shown in FIG. 2, it is understood that computing device(s) 66, controller 68, and sensor(s) 70 may be included in any of the non-limiting examples discuss herein.

Embodiments of the disclosure are operable to control water level WL within pressure vessel 74 based on various attributes of power generation system 12, particularly including two-phase flow characteristics and the size of unsurfaced steam bubbles in pressure vessel 74. Control over water level WL in pressure vessel 74 has proven to be a technical challenge in conventional systems, e.g., because of two-phase flow of fluids into pressure vessel 74. Challenges to the modeling and control of water level WL during operation of power generation system 12 include the operational parameter of various other components within system 12. For example, parameters such as pressure within pressure vessel 74, feedwater inlet flow from feedwater conduit 75, water extracted from pressure vessel 74, steam flow into or out of pressure vessel 74 and interconnected components such as boiler module(s) 72, heat energy input as determined by the temperature of exhaust fluid 60 and/or other thermal sources (not shown), etc., may affect whether water level WL is sufficient at a given time. These parameters themselves are also functions of still other variables, e.g., user demand on power generation system 12, fuel availability, ambient temperature or pressure, steam flow bypassing HRSG 54 and/or boiler module(s) 72, etc.

Despite the complexity of this technical challenge, failure to maintain a water level WL in pressure vessel 74 at approximately the position of target water level TL may cause technical risks, e.g., to protect against water injection into the steam turbine components, mechanical wear to portions of HRSG 54, and/or undesired outages of power generation system 12 to prevent such damage. Applicants have determined that fluctuations in the size of steam bubbles beneath the surface of water that have not evaporated into the steam output is a leading cause of difficulty in controlling water level WL within pressure vessel 74. Steam bubbles positioned beneath the surface of water may be known as "unsurfaced steam bubbles." The presence of unsurfaced steam bubbles within pressure vessel 74 will further affect water level WL within pressure vessel 74, even when the water volume itself remains substantially constant. Embodiments of the present disclosure monitor pressure within pressure vessel 74, and mass flux into and out of pressure vessel 74, to account for the change in steam bubble size to maintain an acceptable water level WL during operation. Embodiments of the present disclosure may be particularly suitable for transient operation (e.g., startup, mode shifts, etc.) of power generation system 12 typically associated with pressure fluctuations.

The properties of power generation system 12 operating in a start-up mode are generally discussed to further demonstrate pressure fluctuation in pressure vessel 74. During a start-up procedure of power generation system 12, and specifically when HRSG 54 initially begins to generate steam, header 88 and/or outlet manifold 90, which may be at reduced or pre-start temperature (e.g., room temperature), may be immediately exposed to heated, high-temperature steam, which in turn may be generated with exhaust fluid 60. Header 88 and/or outlet conduit 90 may undergo a rapid temperature change and/or an increase in temperature as a result of being exposed to the heated, high-temperature steam. Bypass conduit 100 may aid in the reduction of the thermal fatigue and/or stress experienced by header 88 and/or outlet manifold 90 of HRSG 54 during operation of power generation system 12. For example, bypass conduit 100 may provide a portion of the steam from pressure vessel 74 flowing through conduit 92 to header 88 and/or outlet manifold 90 during operation of HRSG 54. The portion of steam provided from conduit 92 to header 88 and/or outlet manifold 90 of HRSG 54 may be steam that has been generated but not yet heated or superheated. That is, the steam provided to bypass conduit 100 from conduit 92 may be steam that has not yet been passed through any of the plurality of superheater modules 80, 82, 84 configured to heat the steam, as discussed herein. As such, the portion of steam provided to header 88 and/or outlet manifold 90 of HRSG 54 via bypass conduit 100 may be cooler and/or have a lower temperature than the heated, high-temperature steam provided to header 88 and/or manifold 90 via third superheater module 84, as discussed herein.

Although bypass conduit 100 and boiler modules 72 may help to reduce thermal fatigue and similar effects on HRSG 54 components, these features in some cases may affect target water level TL to maintain reliable operation of HRSG 54. The fluctuating amount of steam passing through boiler modules 72, temperature(s) of exhaust fluid 60, and other changes caused, e.g., by operation of controller 68, may vary the amount of feedwater entering pressure vessel 74 and/or steam output from pressure vessel 74. Thus, the target water level TL in pressure vessel 74 will be influenced by both the parameters of GT system 30 and ST system 18 of power generation system 12. When boiling occurs within pressure vessel 74, steam bubbles will form beneath the surface of the water before rising above the water level to exit pressure vessel 74. At the same time, additional feedwater enters pressure vessel 74 via feedwater conduit 75 and natural convection circulates the water.

As operation continues, water level WL of pressure vessel 74 will vary based on the size and number of unsurfaced steam bubbles. Unsurfaced steam bubbles within pressure vessel 74 may be known alternatively as voids. Steam is a compressible gas, and hence the volume of unsurfaced steam bubbles will increase or decrease as the pressure within vessel 74 changes. In cases where the pressure within pressure vessel 74 decreases, the volume of unsurfaced steam bubbles will expand (also known as "swelling"). In cases where the pressure within pressure vessel 74 increases, the volume of unsurfaced steam bubbles will contract (also known as "shrinking"). Events which change the pressure within pressure vessel 74 sufficiently to cause steam bubble expansion and/or contraction may generally be referenced herein as a "disturbance." The varying operational parameters of system 12 will cause unsurfaced steam bubbles to fluctuate rapidly between expansion and contraction as operation continues. Contractions of unsurfaced steam bubbles will reduce water level WL, and expansion of unsurfaced steam bubbles will increase water level WL. Such changes in water level WL, due to the volume of steam bubbles, may cause sensor(s) 70 to detect a fictitious change to the total amount of water in pressure vessel WL, i.e., a change in water volume that is higher or lower than the true change to water volume. Control systems which fail to account for expansion and/or contraction of steam bubbles in pressure vessel 74 have a higher risk of instability or unintended shutdowns. For example, a conventional model of power generation system 12 may detect a fictitious reduction in water level WL when shrinking occurs. This may cause the control system to fully open flow valve 108 despite no actual change to the amount of water in pressure vessel 74. As the pressure that caused the shrink decreases, the steam bubble volume will increase along with the apparent water level WL in pressure vessel 74. When such events also accompany a substantial influx of feedwater in feedwater conduit 75, this would result in an oversupply of water in pressure vessel 74. An oversupply of water may subsequently affect estimates of target water level TL as operation continues, causing instability and may cause an unintended shutdown of power generation system 12.

Figure 3:
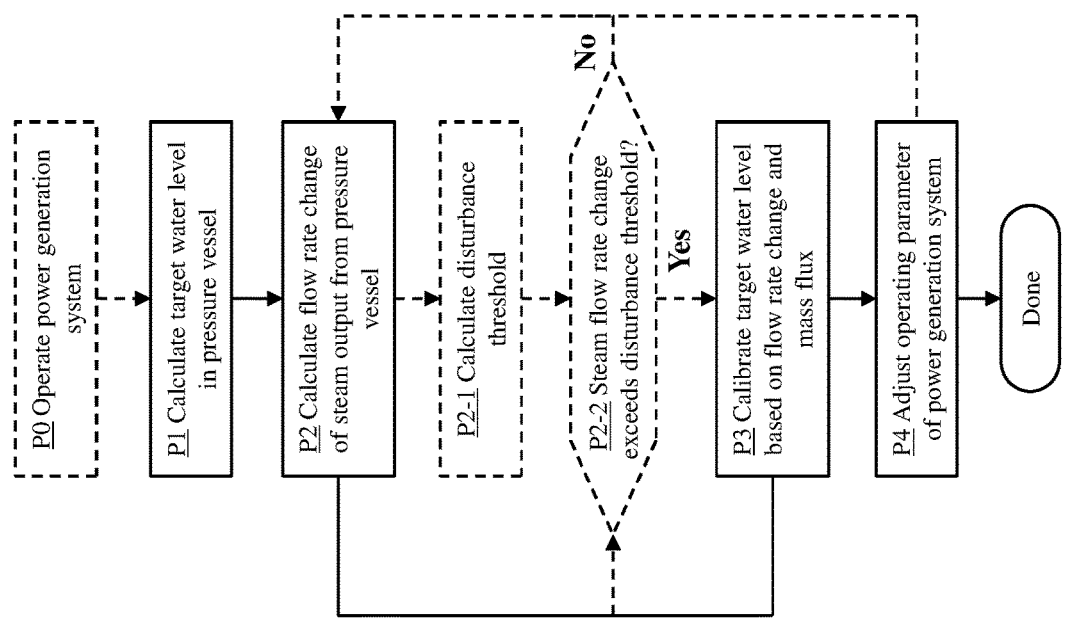
FIG. 3 provides an illustrative flow diagram of a method for controlling the water level in a pressure vessel of a power generation system according to embodiments of the disclosure.
Figure 4:
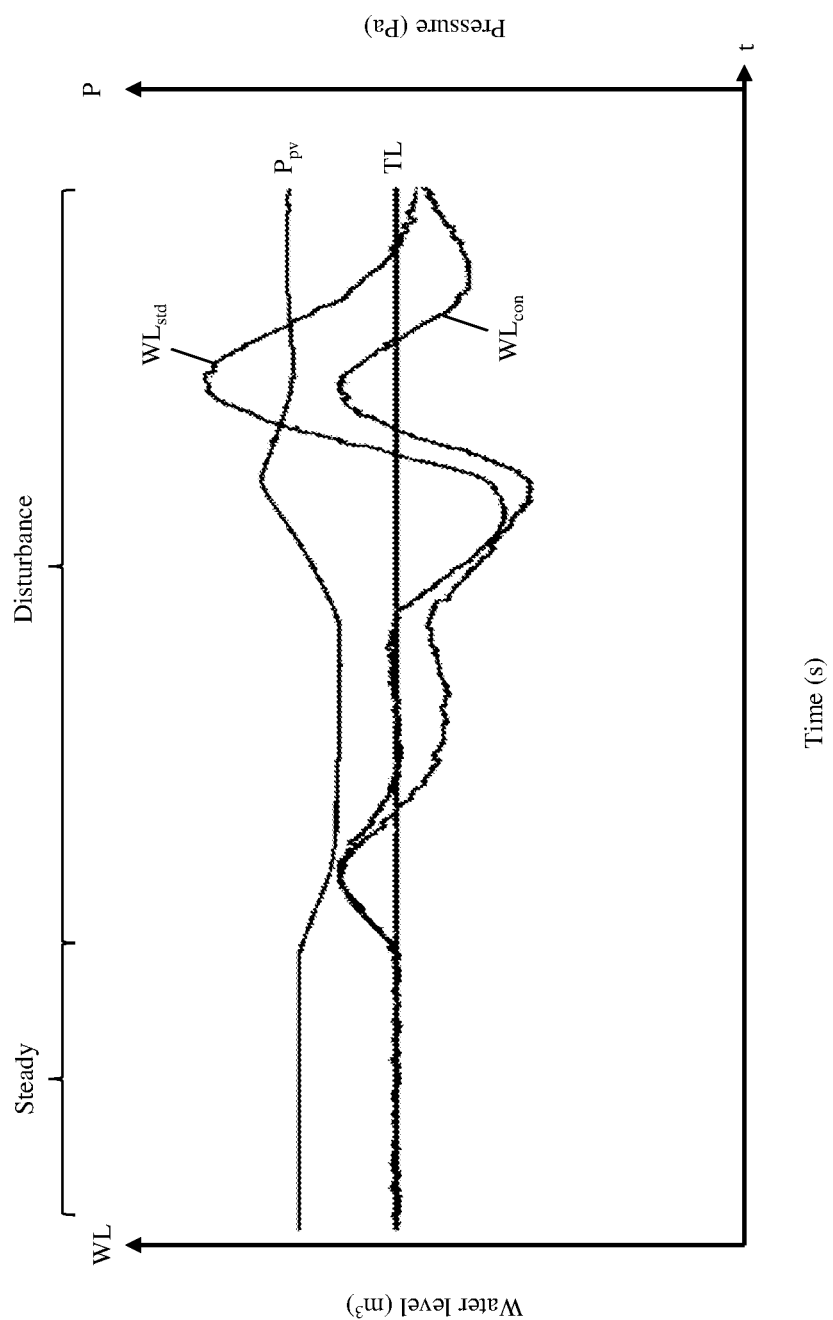
FIG. 4 provides an example plot of water level and pressure in a pressure vessel versus time while operating a power generation system.

Referring now to FIGS. 2 and 3 together, an illustrative flow diagram for implementing various embodiments of the disclosure is provided. Embodiments of the methodologies described herein may be implemented, e.g., using controller 68 of computing device 66, various modules and/or subcomponents of computing device 66 and/or controller 68. Methods according to the disclosure may also rely on other components such as sensor(s) 70 in communicatively coupled to computing device 66 and/or controller 68 to measure and/or otherwise determine various parameters to be used as a basis for the processes discussed herein. As discussed herein, controller 68 may adjust various operational parameters of power generation system 12, e.g., by opening, closing, or otherwise adjusting the position of valve(s) 106, 108 to control fluid flow therethrough. In still further embodiments, controller 68 may be operable to modify other instructions and/or actions undertaken via computing device 66 and/or controller 68, e.g., by modifying a predetermined corrective adjustment of a PID controller system or sub-system. The illustrative flow diagram in FIG. 4 is shown with several processes organized in an example flow, but it is understood that one or more processes may be implemented simultaneously and/or sequentially, and/or executed in any alternative order while maintaining the various technical features described by example herein.

A preliminary operation in embodiments of the present disclosure may include, e.g., process P0 of operating power generation system 12, including ST system 18 (FIG. 1) and GT system 30 (FIG. 1) therein. During the operation of power generation system 12 in process P0, computing device 66 and/or controller 68 may use sensors 70 and various modules to implement other control features of power generation system 12, e.g., controlling the power output of systems 18, 30, a fuel combustion rate in GT system 30, an operating mode of each system 18, 30, etc. It is thus understood that embodiments of the present disclosure may be implemented simultaneous with, and/or subsequent to, other methodologies for controlling the operation of power generation system 12 via the same computing device(s) 66 and/or controller(s) 68, and/or different computing devices, controllers, or other mechanical or electronic-based control devices.

A process P1 in embodiments of the present disclosure may include calculating target water level TL for pressure vessel 74, e.g., using controller 68. In process P1, the calculating of target water level TL may be based on conventional mathematical models and/or various inputs (e.g., provided by sensors 70) for quantifying a desired amount of water in pressure vessel 74 during operation. More specifically, process P1 to calculate the target water level TL may be performed without regard to whether a disturbance causes unsurfaced steam bubbles in pressure vessel 74 to undergo expansion or contraction as noted elsewhere herein. Pressure vessel 74 may receive a feedwater input from feedwater conduit 75, in addition to water and/or steam from steam generator module 76, and may generate a steam output to conduit 92 as operation continues. The various inputs and outputs to pressure vessel 74, as well as the power output of systems 18, 30 and other operational parameters, may be included in any conceivable algorithm, mathematical model, etc., to calculate a target water level TL in process P1. However calculated in process P1, target water level TL may be expressed in terms of, e.g., a percentage of water volume relative to pressure vessel 74 volume, a height of water within pressure vessel 74 expressed in meters (m) or other height units above its lower surface, a volume of water in cubic meters (m³) or other volumetric units, and/or any other metric for expressing the amount of water inside pressure vessel 74.

Continuing to process P2, embodiments of the disclosure may also include calculating flow rate change of the steam output from the pressure vessel. As noted elsewhere herein, steam flow rate is measurable in cubic meters per second (m³/s) or any other conceivable units of volume or mass per time. Volumetric flow rate of the steam output from of the pressure vessel 74 may be denoted with the variable "$W_{steam}$" in mathematical formulas. Although it is possible to measure the flow rate of steam exiting pressure vessel 74 directly, e.g., using sensor(s) 70, process P2 is concerned with the amount by which steam flow into pressure vessel 74 is changing at a given time. Thus, process P2 may include calculating an instantaneous rate of change, known mathematically as a "derivative," of the steam flow out of the pressure vessel 74. The calculated flow rate change of the steam out of the pressure vessel 74 may vary within expected limits as power generation system 12 shifts between different operating modes, e.g., startup, steady state, peak operating demand, reduced operating demand, etc., over time. However, methods according to the disclosure may be configured to account for high rates of change when such flow rate changes cause expansion or contraction of steam bubbles in pressure vessel 74. In further processes discussed herein, methods according to the disclosure may recalibrate the target water level TL, calculated in process P1, to account for such disturbances. Embodiments of the present disclosure may further analyze the flow rate change calculated in process P2 to determine whether a disturbance has occurred, but this is not necessary in all implementations.

According to an example, methods according to the disclosure may implement process P3 to calibrate target water level TL in pressure vessel 74 based on, e.g., the flow rate change calculated in process P2 and a mass flux of pressure vessel 74. Mass flux may be modeled as the difference between steam flow and feedwater flow in pressure vessel 74, and thus may be characterized more simply as a change in the mass within pressure vessel 74 in a simplistic example. As used herein, the term "calibrate" refers to increasing or decreasing target water level TL for pressure vessel 74 to counteract the expansion and/or contraction of unsurfaced steam bubbles within pressure vessel 74. The amount of change may be calculated as part of process P3, e.g., by dividing the change in mass by the density of water to derive a change in volume. Process P3 may include, e.g., increasing target water level TL by an increment (e.g., an amount independently calculated in real time, or predetermined in various other implementations) in cases where the flow rate change and mass flux through pressure vessel 74 indicate expansion. Controller 68 may increase target water level TL in process P3 to account for expansion, e.g., because the water level will appear to be higher than its actual amount. In another example, process P3 may include controller 68 decreasing target water level TL by a predetermined increment in cases where the flow rate change and mass flux through pressure vessel 74 indicate shrinking. Controller 68 may decrease target water level TL in process P3 to account for expansion, e.g., because the water level will appear to be lower than its actual amount.

Proceeding to process P4, controller 68 may adjust one or more operating parameters of power generation system 12, which in turn may adjust water level WL in pressure vessel 74 to its calibrated value. For instance, embodiments of the disclosure may include adjusting the position of flow valve 108 to increase or decrease the feedwater input to pressure vessel 74 through feedwater conduit 75. The adjusting of flow valve 108 may include, e.g., transmitting a signal to a mechanical converter (not shown) of flow valve 108 configured to convert electrical energy into a mechanical adjustment to flow valve 108. In various alternative embodiments, computing device(s) 66 and/or controller(s) 68 may adjust various valves, components, fluid flow rates, etc., within power generation system 12 to control the amount of water in pressure vessel 74 by other currently known or later developed techniques. In still further embodiments, controller 68 may implement process P4 on a PID controller and/or PID sub-system of computing device(s) 66 and/or controller(s) 68 by adjusting a predetermined corrective adjustment to the PID controller algorithm. For instance, if a corrective adjustment of PID controller algorithm causes flow valve 108 to partially close when detecting a high water level in pressure vessel 74, the corrective value may be lessened at process P4, e.g., when an expansion of unsurfaced steam bubbles would raise the apparent water level. Thus, computing device(s) 66 and/or controller 68 may cause pressure vessel 74 to include the calibrated water level WL, instead of the original target water level TL calculated in process P1. The method may conclude ("Done"), or alternatively proceed in a looping fashion by returning to process P2 and recalculating the flow rate change of the steam emitted from pressure vessel 74. Where desired, methods according to the disclosure may include continuous monitoring for disturbances (i.e., projected expansion or contraction of unsurfaced air bubbles) and consequent adjustments to power generation system 12.

Methods according to the disclosure may additionally or alternatively include further processes, e.g., to distinguish between insubstantial changes in steam flow through pressure vessel 74 and rates of change indicative of disturbance. In an embodiment, methods according to the disclosure optionally may include process P2-1 of calculating a disturbance threshold, after calculating the flow rate change of the steam emitted from the pressure vessel 74. In other embodiments where the disturbance threshold is predetermined, process P2-1 may be omitted entirely, or replaced with a step of querying the disturbance threshold for subsequent analysis. The disturbance threshold may indicate a maximum instantaneous slope (positive or negative) in the steam flow input to pressure vessel 74. A flow rate change exceeding the disturbance threshold may indicate a projected expansion or contraction of unsurfaced steam bubbles, and that the resulting water level WL in pressure vessel 74 will be fictitiously high or low. In some cases, the calculating the disturbance threshold in process P2-1 may be based on other characteristics of power generation system 12, e.g., the power generation demand, operating mode, combustion temperature, fuel type, etc. In alternative embodiments, one or more disturbance thresholds may be independently predetermined, and thus process P2-1 may be bypassed.

An additional process according to embodiments of the present disclosure may include determining whether to implement process P3 to calibrate target water level TL, e.g., based on whether the flow rate change of the steam output exceeds the disturbance threshold. According to an example, process P2-2 may include determining whether the steam flow rate change is greater than the disturbance threshold (e.g., the threshold calculated in process P2-1). In cases where the steam flow rate change exceeds the disturbance threshold (i.e., "Yes" at process P2-2), the flow method may implement process P3 as described elsewhere herein. In cases where the steam flow rate change does not exceed the disturbance threshold (i.e., "No" at process P2-2), the flow may return to process P2, of again calculating the flow rage change. In this manner, the method can repeat in a loop until the steam flow rate change exceeds the disturbance threshold.

Figure 5:
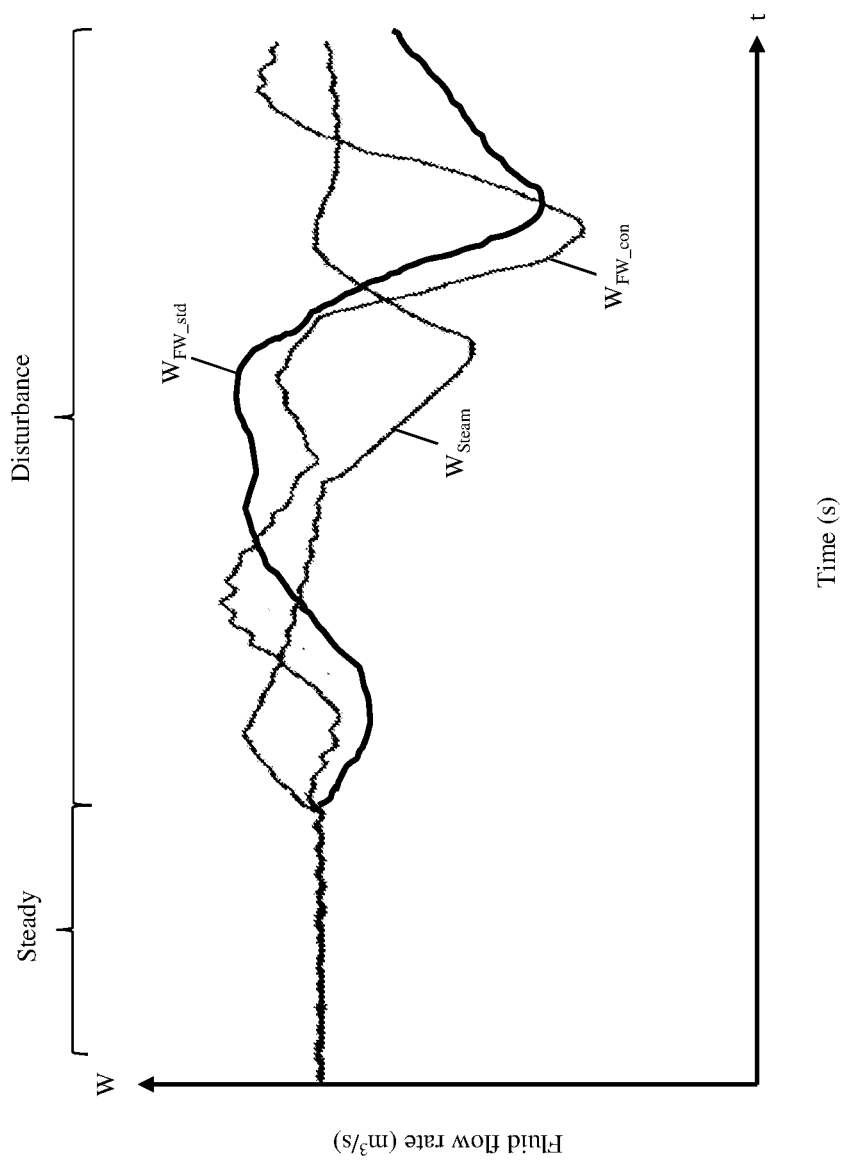
FIG. 5 provides an example plot of feedwater and steam flow output rates versus time while operating a power generation system.

Referring to FIGS. 3-5 together, an example implementation of methods according to the disclosure is discussed with reference to the illustrative plots shown in FIGS. 4 and 5. As noted elsewhere herein, embodiments of the disclosure may be operable to calibrate target water level TL of a pressure vessel, e.g., pressure vessel 74 (FIG. 2) during operation of a power generation system. FIG. 4 provides a plot of water level and pressure versus time during the operation of an example power generation system, e.g., system 12 (FIGS. 1, 2) while FIG. 5 provides a plot of fluid flow rates for steam and feedwater versus time during the operation of the same power generation system. Both plots illustrate the system being in steady state operation before undergoing a disturbance, as described herein. According to the example plot, the disturbance causes an initial, minimal expansion of unsurfaced steam bubbles followed by a subsequent large expansion. In this specific example, the first expansion does not exceed the disturbance threshold but the second expansion exceeds the disturbance threshold. TL (FIG. 4) indicates a setpoint for the water level WL, i.e., target water level TL under the assumption that no expansion or contraction occurs. $P_{pv}$ (FIG. 4) indicates the pressure within pressure vessel 74. $WL_{std}$ (FIG. 4) indicates the water level without calibration by methods according to the disclosure. $WL_{con}$ (FIG. 4) indicates the water level with calibration by methods according to the disclosure. $W_{steam}$ (FIG. 5) indicates the flow rate of the steam output from pressure vessel 74 as noted herein. $W_{FW\_std}$ (FIG. 5) indicates the flow rate of the feedwater input to pressure vessel 74 without calibration by methods according to the disclosure. $W_{FW\_con}$ (FIG. 5) indicates the flow rate of the feedwater input to pressure vessel 74 with calibration by methods according to the disclosure.

To account for signal noise detected by sensors 70, the steam flow signal optionally may be removed from the measured flow rate. To provide this feature, computing device 66 and/or controller 68 may apply a low-pass filter. The methodology may continue by calculating the instantaneous rate of change, i.e., the derivative of the steam emitted from the pressure vessel to implement process P2, via the following equation:

$$\frac{dW_{steam}}{dt} = \frac{\Delta W_{steam}}{\Delta t}$$

Embodiments of the disclosure may be operable to calibrate target water level TL of the pressure vessel when the derivative of the steam output exceeds a, e.g., as indicated by the following equation:

$$\frac{dW_{steam}}{dt} > \alpha$$

Variable a represents the disturbance threshold, which may be characterized based on site data, e.g., based on the pressure vessel 74 under analysis or similar units. Subsequent to, or simultaneous with, evaluating the flow rate change of steam to the pressure vessel, the method may include calculating a mass flux through the pressure vessel. The mass flux may be calculated as a comparison between the amount of mass leaving pressure vessel 74 compared mass entering pressure vessel 75 via feedwater conduit 75. The max flux equation may be expressed as:

ΔMass=Feedwater Flow−Steam Flow

The mass flux may be converted to a projected change in water level in the pressure drum via the following equation:

Mass per in. of water=Volume per mm*water density

In this case, the volume of the pressure vessel may be calculated by a cylindrical model using the diameter of the cylindrical vessel. The water density may be calculated, e.g., in real time using sensor(S) 70, and/or alternatively using a steam table with the known feedwater temperature or drum pressure. The mathematical model of changes to water level may be expressed as:

$$\Delta Level = \frac{\Delta Mass}{Mass\ per\ in.}$$

The variable A represents the expected difference in water level between its value without expansion or contraction, the eventual apparent value due to the change in size of unsurfaced steam bubbles in the pressure vessel. In methods according to the disclosure, a calibrated increase or decrease to the water level may be set equal to the expected change in water level from its otherwise-expected value, accounting for expansion or contraction of unsurfaced steam bubbles in a disturbance. During operation, such a calibration will dampen the response of a controller to transient events, and thus reduces overshooting or undershooting of the water level in a pressure vessel.

Referring specifically to FIG. 4, the profile of water level $WL_{con}$ with calibration according to the disclosure is shown to fluctuate from the target water level TL by only minor amounts. By comparison, the profile of water level $WL_{std}$ without calibration fluctuates widely, e.g., due to the shifting between expansion and contraction causing overcorrections in the amount of feedwater input to the pressure vessel. Similarly in FIG. 5, the feedwater flow rate $W_{FW\_con}$ with calibration is shown to closely track the flow rate of steam $W_{steam}$ output from the pressure vessel, while the feedwater flow rate $W_{FW\_std}$ has a much greater fluctuation over time during the disturbance. Both example plots demonstrate a reduced risk to a power generation system when a disturbance occurs.

Technical effects in various embodiments of the disclosure are to provide greater control of the water level in a pressure vessel to account for the above-noted effects of expansion and/or contraction of unsurfaced steam bubbles during operation. Methods according to the disclosure will affect the total amount of feedwater provided to the pressure vessel and thus improve the effectiveness of a HRSG in a power generation system, e.g., a combined-cycle power plant.

Embodiments of the disclosure provide various technical and commercial advantages, some of which are discussed by example here. Methods according to the disclosure may provide cost savings by reducing the total number of shutdowns during the lifespan of a plant. This in turn may increase the mechanical life of equipment in the power plant. An example technical advantage of the invention is the ability to modify existing control devices to include embodiments of the water level calibration method described herein, e.g., by distribution to such systems via a computer program product. Additionally, embodiments of the disclosure may use other existing sensors in a power generation system to further control operation of the plant, without the need to install and implement new sensors.

The terminology used herein is for the purpose of describing particular embodiments only and is not intended to be limiting of the disclosure. As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

This written description uses examples to disclose the invention, including the best mode, and to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for controlling a power generation system, the method comprising:
   calculating, during operation of the power generation system, a target water level within a pressure vessel of the power generation system, wherein the pressure vessel receives a feedwater input to generate a steam output;
   calculating a flow rate change of the steam output from the pressure vessel;
   calculating a disturbance threshold based on a projected size of steam bubbles within the pressure vessel;
   determining whether the flow rate change of the steam output from the pressure vessel exceeds the disturbance threshold;
   when the flow rate change of steam output from the pressure vessel exceeds the disturbance threshold, calibrating the target water level within the pressure vessel based on the flow rate change of the steam output from the pressure vessel and a mass flux through the pressure vessel, wherein the mass flux through the pressure vessel is derived from at least the feedwater input and the steam output; and
   adjusting a position of a flow valve to control the feedwater input to the pressure vessel;
   adjusting a position of a flow valve coupled to the pressure vessel to adjust a feedwater input into pressure vessel based on the calibrated target water level.

2. The method of claim 1, wherein calculating the disturbance threshold is based on one of a projected unsurfaced steam bubble expansion within the pressure vessel, or a projected unsurfaced steam bubble contraction within the pressure vessel.

3. The method of claim 1, wherein the power generation system includes a heat recovery steam generator (HRSG), and the pressure vessel includes a pressure drum of the HRSG.

4. The method of claim 1, wherein adjusting the operating parameter dampens a predetermined corrective adjustment of a proportional-integral-derivative (PID) controller for managing transient operation of the power generation system.

5. The method of claim 1, wherein calibrating the target water level within the pressure vessel is further based on a mass flow of exhaust fluid in thermal communication with the steam emitted from the pressure vessel.

6. A system for controlling a power generation system, the system comprising:
   a system controller in communication with at least one sensor within the power generation system, the system controller being operable to:
   calculate, during operation of the power generation system, a target water level within the pressure vessel of the power generation system, wherein the pressure vessel receives a feedwater input to generate a steam output, calculate a flow rate change of the steam output from the pressure vessel, calculate a disturbance threshold based on a projected size of steam bubbles within the pressure vessel, determine whether the flow rate change of the steam output from the pressure vessel exceeds the disturbance threshold, and calibrate the target water level within the pressure vessel based on the flow rate change of the steam output from the pressure vessel and a mass flux through the pressure vessel, wherein the mass flux through the pressure vessel is derived from at least the feedwater input and the steam output; and a flow valve operably coupled to the system controller and a component of the power generation system, wherein the system controller adjusts a position of the flow valve based on the calibrated target water level within the pressure vessel to adjust the feedwater input to the pressure vessel.

7. The system of claim 6, wherein the disturbance threshold is based on one of a projected unsurfaced steam bubble expansion within the pressure vessel, or a projected unsurfaced steam bubble contraction within the pressure vessel.

8. The system of claim 6, wherein the power generation system includes a heat recovery steam generator (HRSG), and the pressure vessel includes a pressure drum of the HRSG.

9. The system of claim 6, wherein the system controller is further operable to calibrate the target water level within the pressure vessel based on a mass flow of exhaust fluid in thermal communication with the steam output from the pressure vessel.

10. A program product stored on a non-transitory computer readable storage medium for controlling a power generation system, the non-transitory computer readable storage medium comprising program code for causing a computer system to perform actions including:

calculating, during operation of the power generation system, a target water level within a pressure vessel of the power generation system, wherein the pressure vessel receives a feedwater input to generate a steam output;

calculating a flow rate change of the steam output from the pressure vessel;

calculating a disturbance threshold based on a projected size of steam bubbles within the pressure vessel;

determining whether the flow rate change of the steam output from the pressure vessel exceeds the disturbance threshold;

when the flow rate change of steam output from the pressure vessel exceeds the disturbance threshold, calibrating the target water level within the pressure vessel based on the flow rate change of the steam output from the pressure vessel and a mass flux through the pressure vessel, wherein the mass flux through the pressure vessel is derived from at least the feedwater input and the steam output; and adjusting a position of a flow valve to control the feedwater input to the pressure vessel;

adjusting a position of a flow valve coupled to the pressure vessel to adjust a feedwater input into pressure vessel based on the calibrated target water level.

11. The program product of claim 10, wherein the program code calculates the disturbance threshold based on one of a projected unsurfaced steam bubble expansion within the pressure vessel, or a projected unsurfaced steam bubble contraction within the pressure vessel.

12. The program product of claim 10, wherein the power generation system includes a heat recovery steam generator (HRSG), and the pressure vessel includes a pressure drum of the HRSG.

13. The program product of claim 10, wherein adjusting the operating parameter dampens a predetermined corrective adjustment of a proportional-integral-derivative (PID) controller for managing transient operation of the power generation system.

14. The program product of claim 10, wherein calibrating the target water level within the pressure vessel is further based on a mass flow of exhaust fluid in thermal communication with the steam output from the pressure vessel.

* * * * *

UNITED STATES PATENT AND TRADEMARK OFFICE
CERTIFICATE OF CORRECTION

| | |
|---|---|
| PATENT NO. | : 11,208,920 B2 |
| APPLICATION NO. | : 16/433119 |
| DATED | : December 28, 2021 |
| INVENTOR(S) | : John Lawrence Meyer and Cody Joe Bushey |

Page 1 of 1

It is certified that error appears in the above-identified patent and that said Letters Patent is hereby corrected as shown below:

In the Specification

In Column 18, Line 30, beginning "The variable A represents the expected difference..." should be corrected to "The variable $\Delta$ represents the expected difference..."

Signed and Sealed this
Fifth Day of April, 2022

Drew Hirshfeld
*Performing the Functions and Duties of the
Under Secretary of Commerce for Intellectual Property and
Director of the United States Patent and Trademark Office*